US012612252B2

(12) United States Patent
Fu et al.

(10) Patent No.: US 12,612,252 B2
(45) Date of Patent: Apr. 28, 2026

(54) CYCLIC ROTARY DISPENSING DEVICE AND VENDING DEVICE HAVING SAME

(71) Applicants: Ou Jin, Changsha (CN); Yuxin Jin, Changsha (CN)

(72) Inventors: Xiaorong Fu, Wenzhou (CN); Ou Jin, Changsha (CN); Yuxin Jin, Changsha (CN)

(73) Assignees: Ou Jin, Changsha (CN); Yuxin Jin, Changsha (CN)

( * ) Notice: Subject to any disclaimer, the term of this patent is extended or adjusted under 35 U.S.C. 154(b) by 418 days.

(21) Appl. No.: 18/458,169

(22) Filed: Aug. 30, 2023

(65) Prior Publication Data

US 2023/0399175 A1 Dec. 14, 2023

Related U.S. Application Data

(63) Continuation of application No. PCT/CN2022/110349, filed on Aug. 4, 2022.

(30) Foreign Application Priority Data

Aug. 19, 2021 (CN) .......................... 202110953807.7

(51) Int. Cl.
*B65G 1/137* (2006.01)
*G07F 11/24* (2006.01)

(52) U.S. Cl.
CPC .............. *B65G 1/137* (2013.01); *G07F 11/24* (2013.01)

(58) Field of Classification Search
CPC .................................. B65G 1/137; G07F 11/24
See application file for complete search history.

(56) References Cited

U.S. PATENT DOCUMENTS 10,689,240 B1* 6/2020 Schultz ................ B67D 1/0064
2023/0141811 A1* 5/2023 Dresser ................... G07F 13/10
141/174

FOREIGN PATENT DOCUMENTS

CN 108133545 A 6/2018

OTHER PUBLICATIONS

"Gear template generator help",2018, https://web.archive.org/web/20180916000855/http://woodgears.ca/gear/help2/index.html (Year: 2018).*

* cited by examiner

*Primary Examiner* — Allen C Chein

(57) ABSTRACT

A cyclic rotary dispensing device and a vending device with the same are provided. The dispensing device includes: a housing, a closed bent slideway disposed on the housing, multiple dispensing assemblies disposed along the closed bent slideway and abutted against each other, a driving assembly and a detection assembly disposed below the closed bent slideway; bottoms of the dispensing assemblies are provided with protrusions; the driving assembly includes a rotary pulling piece disposed below the closed bent slideway and a driving member for driving the rotary pulling piece to rotate; the rotary pulling piece is rotated to drive the protrusions to move, to thereby make the dispensing assemblies cyclically move along the closed bent slideway; the detection assembly is electrically connected to the driving assembly, and is configured to detect positions of the dispensing assemblies. The dispensing device improves the efficiency for selling, and is convenient to maintain.

17 Claims, 6 Drawing Sheets

CYCLIC ROTARY DISPENSING DEVICE AND VENDING DEVICE HAVING SAME

TECHNICAL FIELD

The disclosure relates to the technique field of new vending machines, and more particularly to a dispensing device with a cyclic rotary feature, which can be used not only in a vending device, but also in a display cabinet or an automatic dispensing shelf in an unmanned store.

BACKGROUND

Dispensing devices in the related art are mainly used in a field of unmanned vending, performance of the dispensing devices is evaluated by comprehensively considering various factors such as: 1. whether the dispensing device can load more commodities in a same volume; 2. whether a cost of the dispensing device is cheap; 3. whether the dispensing device can adapt different packaging forms of the commodities.

Freight lane types (i.e., commodity passage types) of the dispensing devices in the related art include a spring freight lane, a snake-shape freight lane, a track freight lane and the like. Features of these freight lanes are that when a commodity is shipped, the commodity needs to leave the freight lane where the commodity is located and a space for the commodity to be dropped is required, which will seriously waste an inventory space.

In the related art, Chinese patent with publication NO. CN 108133545A discloses a dispensing device of a rotary discharging type automatic vending machine, a belt of the dispensing device is used to connect different dispensing units, and a commodity is driven to a specified position by a motor. The disadvantages of the above freight lanes are overcome by this dispensing device, however, there are the following disadvantages: 1. corresponding positions are occupied by a driving belt and a gear to make the dispensing device occupy a large space; 2. the dispensing device is limited by the belt, resulting in a belt layout that can only be a quasi-circular structure, a dispensing quantity of the dispensing device is greatly limited; 3. the dispensing device is driven by the belt, resulting in a higher cost.

Based on that, it is necessary to provide a new dispensing device and a vending device to overcome the above disadvantages.

SUMMARY

Aiming at the above disadvantages of the related art, the disclosure provides a cyclic rotary dispensing device and a vending device with the same. The disclosure utilizes dispensing boxes (i.e., dispensing assemblies) inside a closed bent slideway to arrange in close combination, a structure of the dispensing device is compact and simple, which greatly reduces a cost of a freight lane and expands a usage range of the freight lane.

In order to achieve the above purpose, the disclosure provides a cyclic rotary dispensing device, and the dispensing device includes a housing, a closed bent slideway, multiple dispensing assemblies, a driving assembly and a first detection assembly. The closed bent slideway is disposed on the housing; the multiple dispensing assemblies are disposed along the closed bent slideway and abutted against each other, and a bottom of each of the dispensing assemblies is provided with a protrusion; the driving assembly is disposed below the closed bent slideway, and the driving assembly includes a rotary pulling piece disposed below the closed bent slideway and a driving member configured to drive the rotary pulling piece to rotate, and the rotary pulling piece is configured to rotate to drive the protrusion to move, to thereby make the dispensing assemblies cyclically move along the closed bent slideway; and the first detection assembly is disposed below the closed bent slideway, and is electrically connected to the driving assembly, and the first detection assembly is configured to detect a position of each of the dispensing assemblies.

In an embodiment, the driving member includes a driving motor and a speed change gearbox, and the speed change gearbox is connected to the rotary pulling piece.

In an embodiment, each of the dispensing assemblies is in contact with the closed bent slideway by a guide pulley.

In an embodiment, each of the dispensing assemblies includes the guide pulley and a rotary drum disposed on the guide pulley, and a side of the rotary drum is provided with an opening.

In an embodiment, a side of the opening of the rotary drum is further provided with a segment gate.

In an embodiment, the housing includes a first groove body, a closed bent through-hole, an inner plate and a support member. An upper surface of the first groove body defines the closed bent through-hole; the inner plate is disposed in the closed bent through-hole, and an inner wall of the closed bent through-hole is opposite to an outer wall of the inner plate; and the support member is disposed on a lower surface of the first groove body, and the support member is fixedly connected to the inner plate and the first groove body.

In an embodiment, the housing further includes a second groove body, and the second groove body is detachably connected to the first groove body; an end of the support member is fixedly connected to the inner plate, and another end of the support member is fixedly connected to the second groove body.

In an embodiment, a space for holding the driving assembly is defined between the first groove body and the second groove body.

In an embodiment, the rotary pulling piece includes a rotary shaft and pulling pieces. The rotary shaft is disposed on a center of the rotary pulling piece; and the pulling pieces are symmetrically disposed along the rotary shaft, a side of each of the pulling pieces is provided with a pulling part, and a side of each of the pulling pieces facing away from the pulling part is provided with an arc-shaped part.

In an embodiment, the inner plate is provided with a reinforcement block thereon.

In another aspect, the disclosure provides a vending device, and the vending device includes the above cyclic rotary dispensing device, a container and a central processing unit; the container is provided with at least one pickup hole, a commodity on the container is taken out through a target pickup hole of the at least one pickup hole when one of the multiple dispensing assemblies is moved to the target pickup hole; and the central processing unit is electrically connected to the dispensing device, both the central processing unit and the dispensing device are disposed inside the container, and an opening of the dispensing device at a dispensing position is in communication with outside.

The disclosure provides the cyclic rotary dispensing device, the dispensing device can be disposed in a unit structure (such as a vending machine pallet, an unmanned vending shelf), the dispensing assemblies are tightly arranged along the closed bent slideway in sequence, the driving assembly is configured to control one of the dispensing assemblies to slide forward along the closed bent slideway according a command of the first detection assembly, other dispensing assemblies within the closed bent slideway are squeezed to slide forward in sequence. Efficiency for selling is improved by multiple cyclic moving dispensing assemblies of the disclosure, and the dispensing device has advantages such as a compact structure, a high space utilization rate, a low manufacturing cost, and convenient maintenance. The dispensing device can sell commodities with different packaging specifications and multiple types at the same time.

Figure 1:
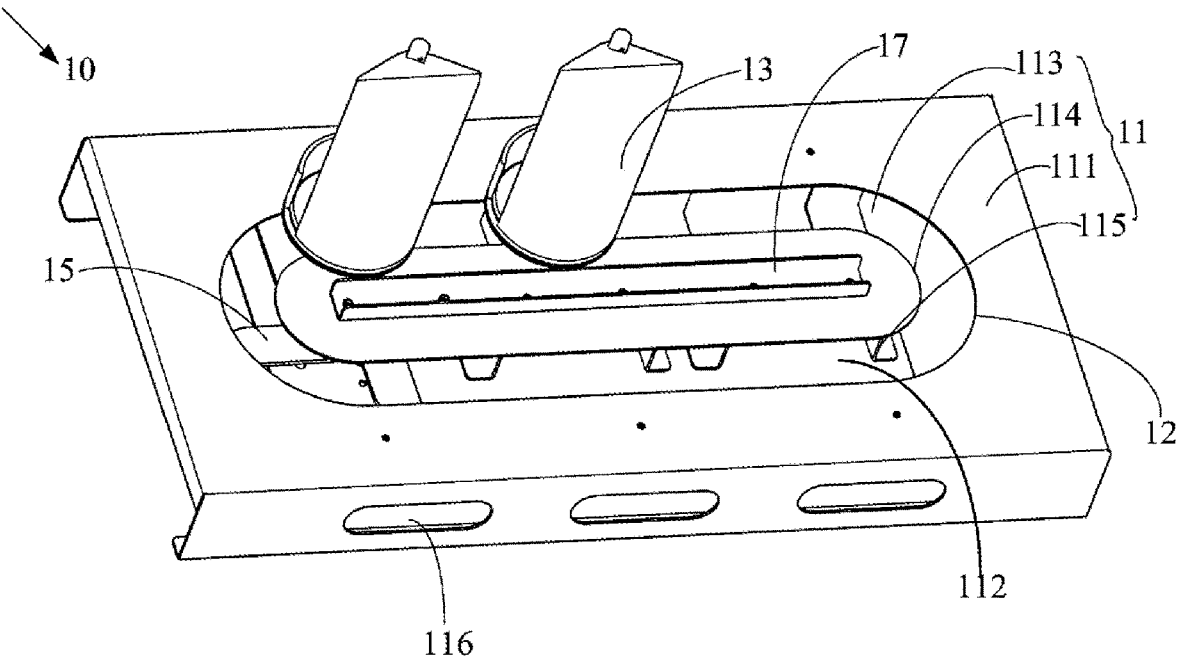
FIG. 1 illustrates a schematic structural diagram of a dispensing device according to an embodiment of the disclosure.

Description of reference numerals: 10—dispensing device; 11—housing; 111—first groove body; 112—second groove body; 113—closed bent through-hole; 114—inner plate; 115—support member; 116—checking hole; 12—closed bent slideway; 13—dispensing assembly; 132—rotary drum; 133—opening; 14—guide pulley; 15—driving assembly; 151—rotary pulling piece; 151*a*—rotary shaft; 151*b*—pulling piece; 151*c*—pulling part; 152—driving member; 16—protrusion; 17—reinforcement block; 20—container.

DETAILED DESCRIPTION OF EMBODIMENTS

The following provides a detailed description of the disclosure in conjunction with embodiments. The following embodiments are conducive to further understand the disclosure for those skilled in the art, but do not limit the disclosure in any form. It should be pointed that multiple deformations and improvements can be made without departing from a concept of the disclosure for those skilled in the art and are all within a scope of protection of the disclosure.

In description of the disclosure, it should be understood that terms "center", "longitudinal", "transverse", "length", "width", "thickness", "up", "down", "front", "back", "left", "right", "vertical", "horizontal", "top", "bottom", "inner", "outer", "clockwise", "anticlockwise", and the like indicate orientation or positional relationships based on the orientation or positional relationships shown in drawings and are intended merely to facilitate the description of the disclosure, not to indicate or imply that the device or element referred thereto must have a particular orientation or be constructed and operated in a particular orientation, and therefore are not to be construed as limiting the disclosure.

Moreover, terms "first", and "second" are merely used to describe purposes, cannot be understood to indicate or imply relative importance or implicitly indicate the number of indicated technical features. Thus, features defined with "first" and "second" can explicitly or implicitly include one or more of the features. In description of the disclosure, unless otherwise specified, a meaning of "multiple" is two or more.

In the disclosure, unless otherwise specified and limited, the terms "install", "couple", "connect", "fix" and other terms should be understood in a broad sense. For example, the term "connect" can be a fixed connection, a detachable connection, or an integrally formed; it can be a mechanical connection, an electrical connection, or in communication with each other; It can be a direct connection or an indirect connection through an intermediate medium, which can be an internal communication between two components or an interaction relationship between two components, unless otherwise specified. For those skilled in the art, the specific meanings of the above terms in the disclosure can be understood based on specific circumstances.

Referring to FIGS. 1-7, the embodiments are provided in the disclosure.

The disclosure provides a cyclic rotary dispensing device, the dispensing device 10 includes a housing 11, a closed bent slideway 12, multiple dispensing assemblies 13, a driving assembly 15 and a first detection assembly. The closed bent slideway 12 is disposed on the housing 11. The multiple dispensing assemblies 13 are disposed along the closed bent slideway 12 and abutted against each other, and a bottom of each of the dispensing assemblies 13 is provided with a protrusion 16. The driving assembly 15 is disposed below the closed bent slideway 12, and the driving assembly 15 includes a rotary pulling piece 151 and a driving member 152. The rotary pulling piece 15 is disposed below the closed bent slideway 12, and the driving member 152 is configured to drive the rotary pulling piece 151 to rotate, and the rotary pulling piece 151 is configured to rotate to drive the protrusion 16 to move, to thereby make the dispensing assemblies 13 cyclically move along the closed bent slideway 12. The first detection assembly is disposed below the closed bent slideway 12. The driving assembly 15 is configured to drive the dispensing assemblies 13 to cyclically dispense along the closed bent slideway 12. The dispensing assemblies 13 are tightly arranged along the closed bent slideway 12 in sequence, the driving assembly 15 is configured to drive one of the dispensing assemblies 13 to slide forward along the closed bent slideway 12, other dispensing assemblies 13 are squeezed to slide forward in sequence, and efficiency for selling is improved by multiple cyclic moving dispensing assemblies 13.

Figure 5:
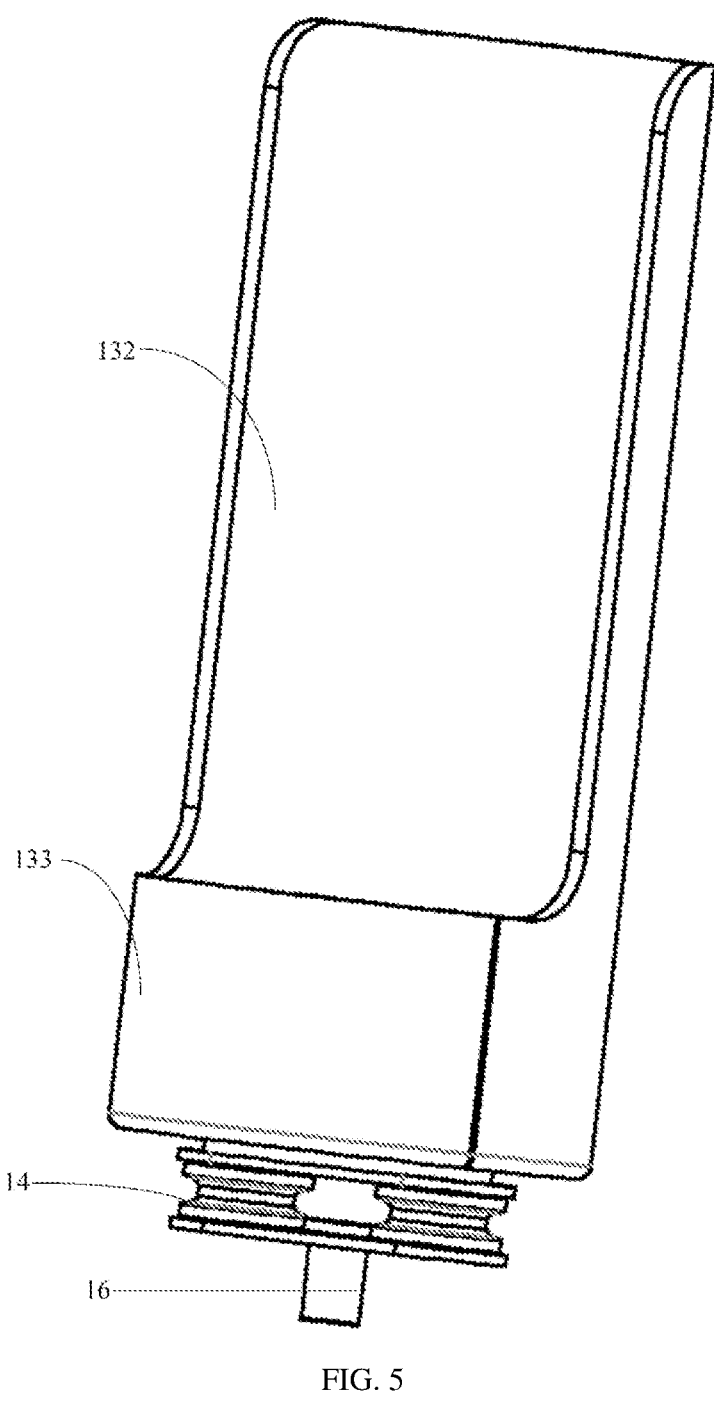
FIG. 5 illustrates a schematic structural diagram of a dispensing assembly of the dispensing device according to an embodiment of the disclosure.
Figure 6:
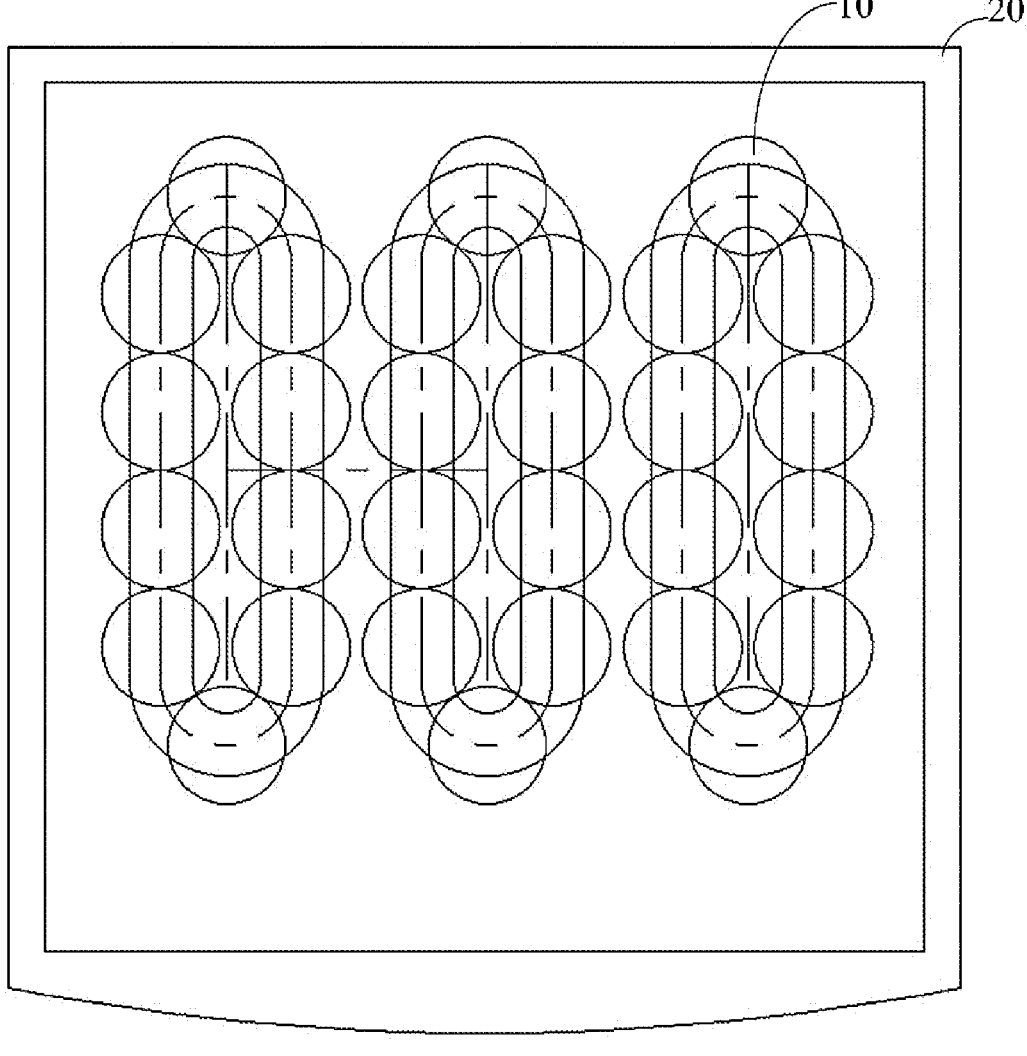
FIG. 6 illustrates a schematic structural diagram of a vending device according to a first embodiment of the disclosure.
Figure 7:
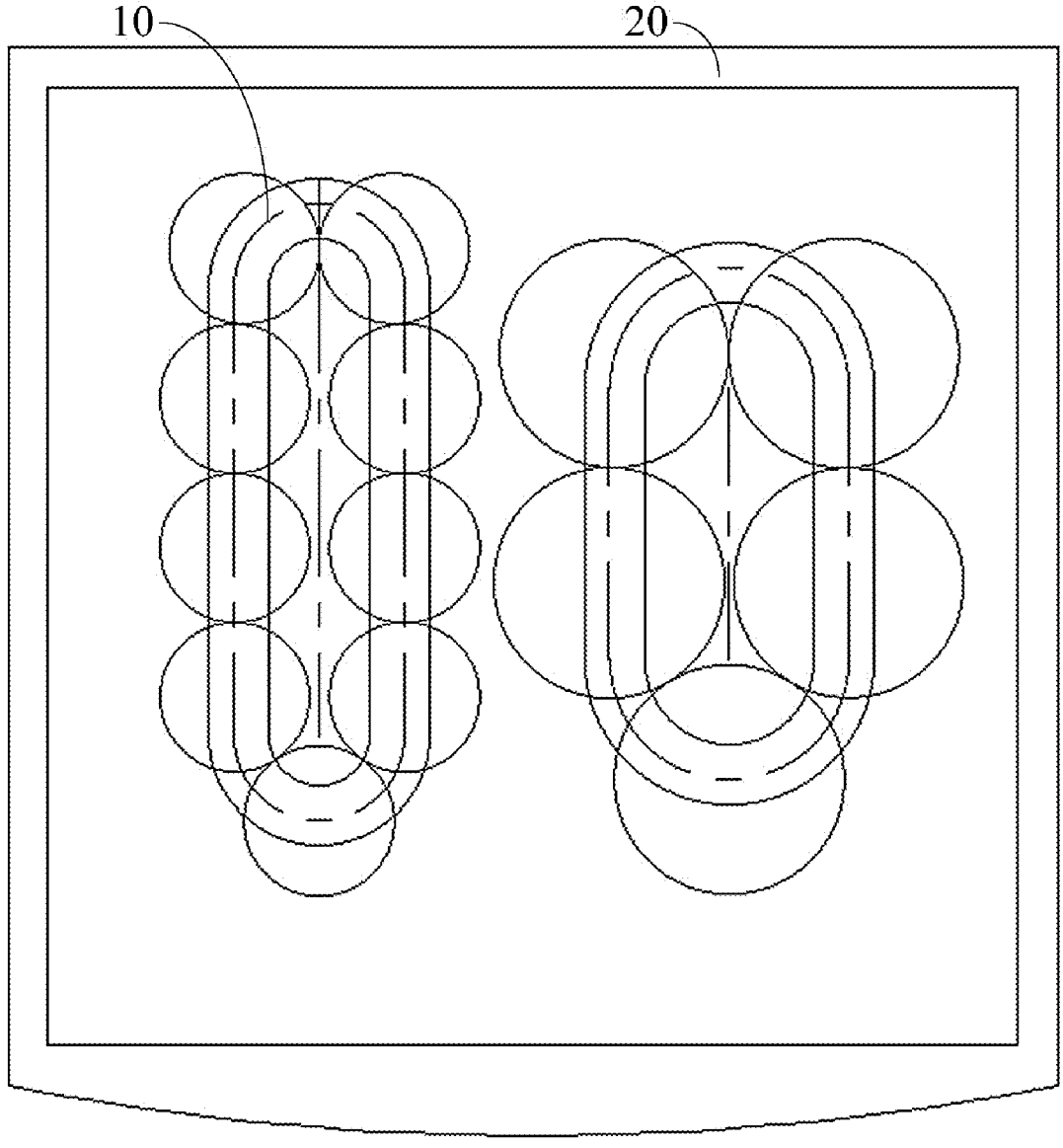
FIG. 7 illustrates a schematic structural diagram of a vending device according to a second embodiment of the disclosure.
Figure 8:
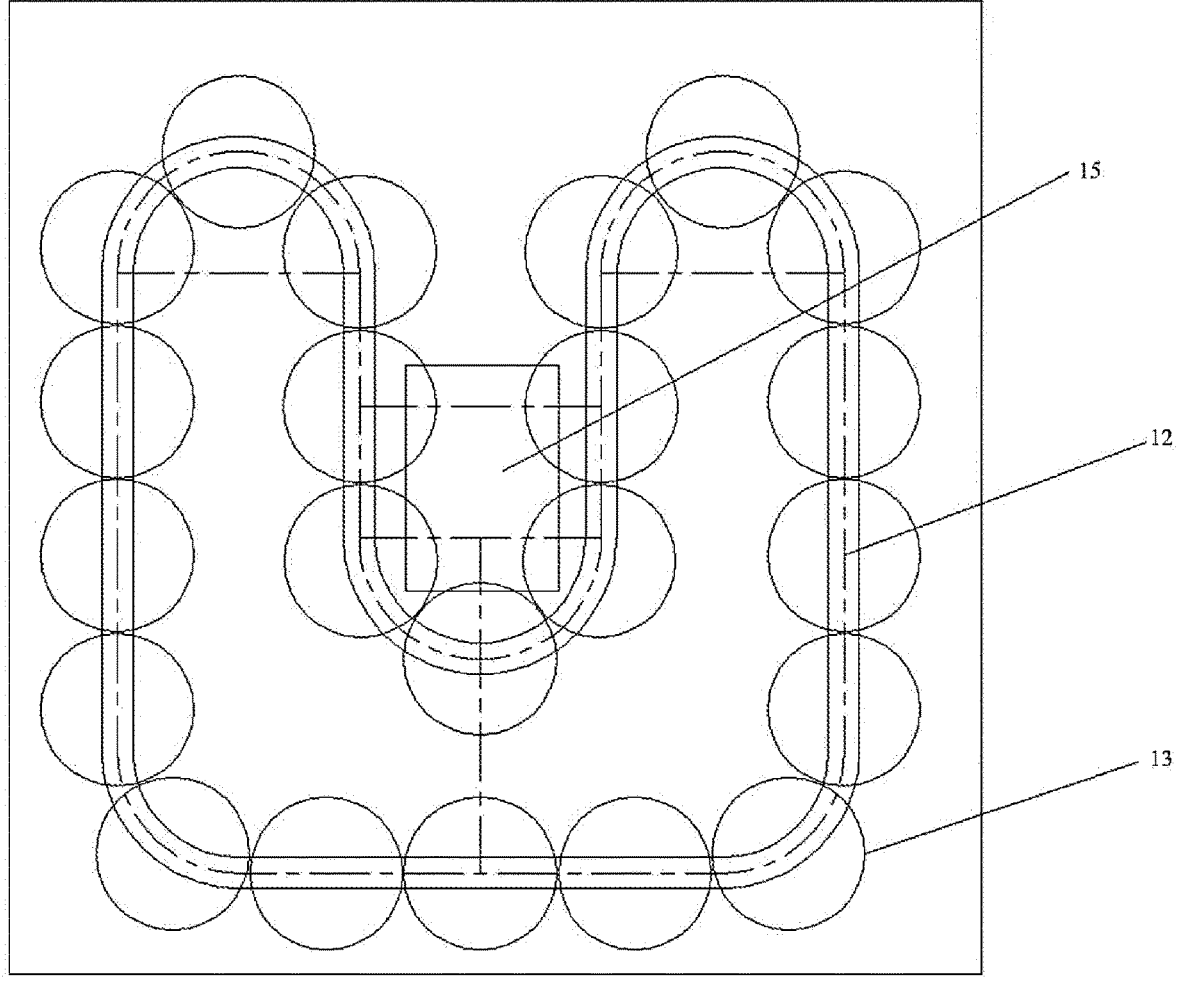
FIG. 8 illustrates a schematic structural diagram of a vending device according to a third embodiment of the disclosure.

In the embodiment, referring to FIGS. 5-7, the closed bent slideway 12 is a closed bent slideway, a shape of the closed bent slideway 12 is not limited to a circle, a runway ring, an ellipse, a square, a quasi-circular structure, or a combination of the above shapes, and the shape of the closed bent slideway 12 can be designed according to actual needs of structures of a pallet and a shelf of a vending device. As shown in FIG. 8, the driving assembly 15 is disposed at an inward depression of the closed bent slideway 12, a rigidity of the closed bent slideway 12 itself is used, and the closed bent slideway 12 is tightly filled with the dispensing assemblies 13, so as to greatly overcome a disadvantage of using a belt structure in the related art, the cyclic rotary dispensing device has a simple and reliable structure, and a capacity of the cyclic rotary dispensing device is significantly expanded.

The dispensing device of the embodiment can be used not only in a vending device, but also in a display cabinet or an automated dispensing shelf in an unmanned store.

The first detection assembly of the disclosure is configured to detect a dispensing position of the dispensing assemblies. Specifically, the first detection assembly is a position detection sensor, such as a photoelectric sensor. The position detection sensor is fixed on the housing 11, and the position detection sensor is disposed below the dispensing assemblies 13. When the dispensing assemblies 13 are moved under a drive of the driving assembly 15 on a closed loop (i.e., closed bent slideway 12), one of the dispensing assemblies 13 is moved to a detection position of the position detection sensor, a command is given by the position detection sensor to stop a motor and wait for pickup.

Figure 2:
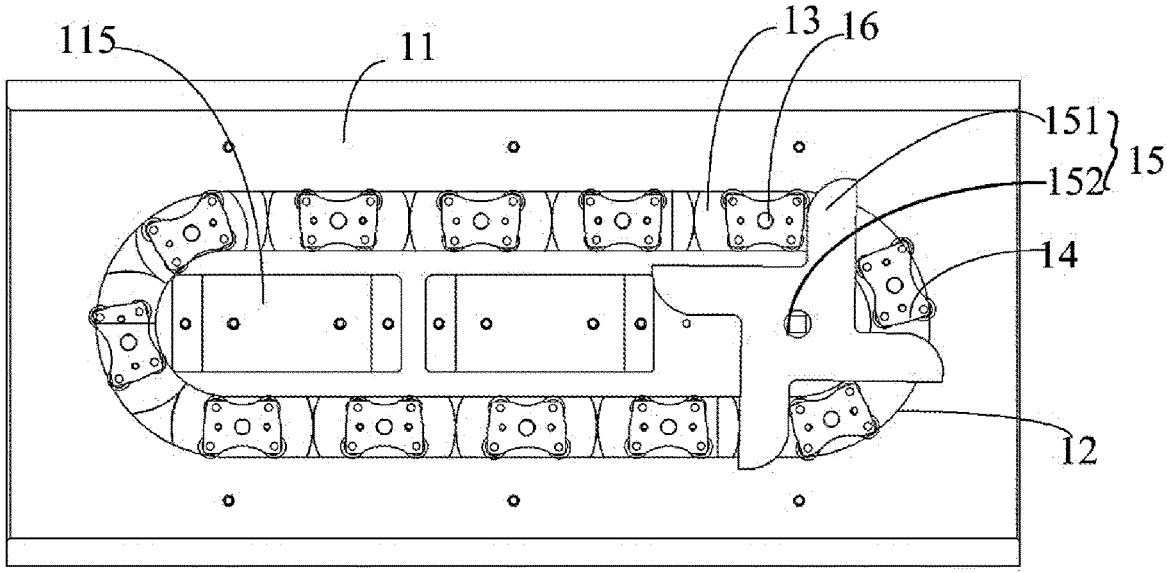
FIG. 2 illustrates a partial schematic structural diagram of the dispensing device according to an embodiment of the disclosure.
Figure 3:
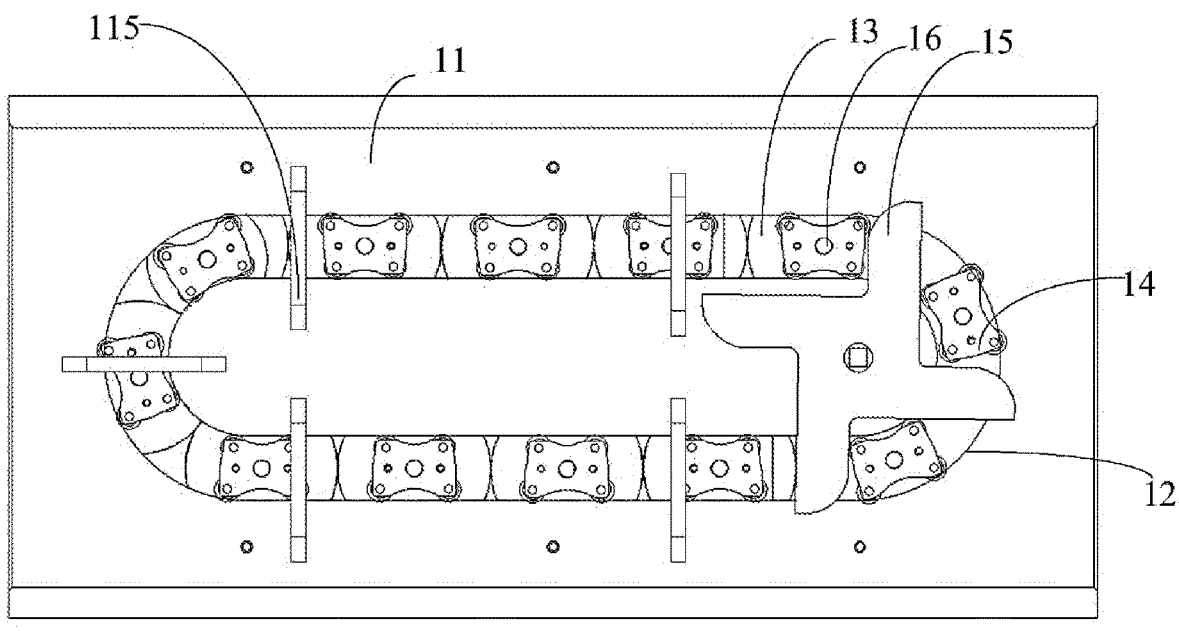
FIG. 3 illustrates a partial schematic structural diagram of a dispensing device according to another embodiment of the disclosure.
Figure 4:
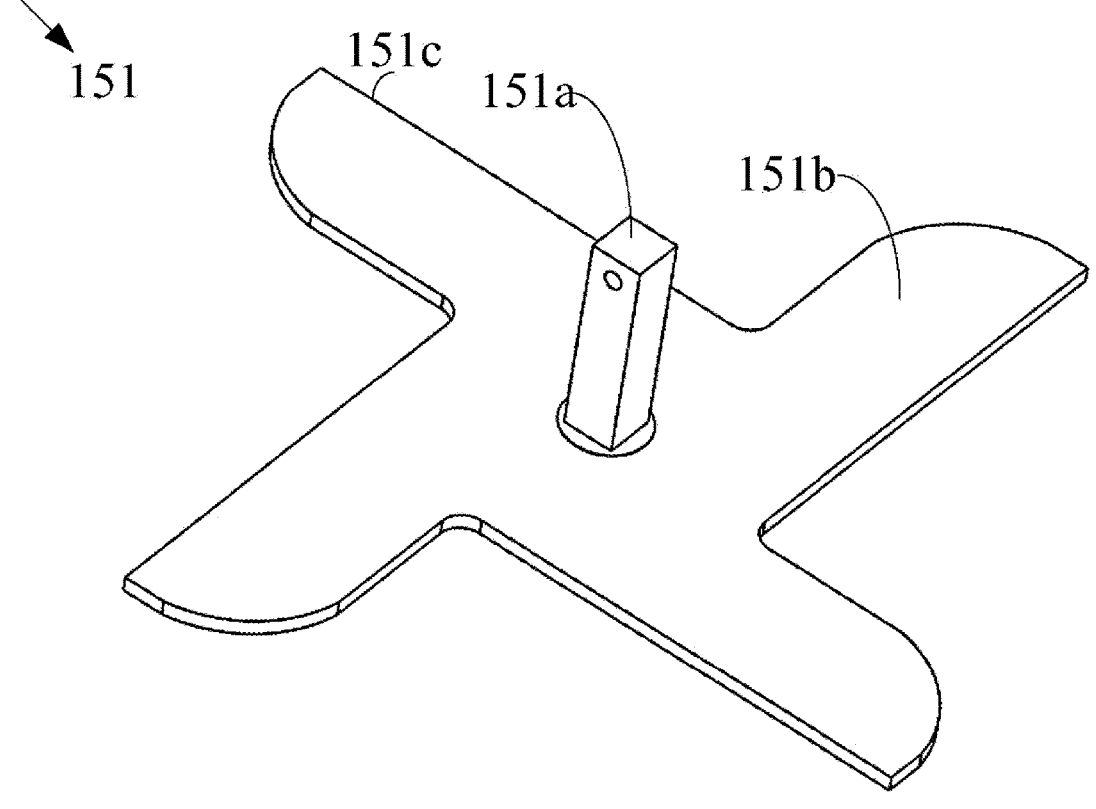
FIG. 4 illustrates a schematic structural diagram of a rotary pulling piece of the dispensing device according to an embodiment of the disclosure.

Referring to FIGS. 1-3, in an embodiment, the housing 11 includes a first groove body 111, a closed bent through-hole 113, an inner plate 114 and a support member 115. An upper surface of the first groove body 111 defines the closed bent through-hole 113. The inner plate 114 is disposed in the closed bent through-hole 113, and an inner wall of the closed bent through-hole 113 is opposite to an outer wall of the inner plate 114. The support member 115 is disposed on a lower surface of the first groove body 111, and the support member 115 is fixedly connected to the inner plate 114 and the first groove body 111. An end of the support member 115 is fixedly connected to the first groove body 111, another end of the support member 115 is fixedly connected to the inner plate 114, and the support member 115 defines a space for the protrusion 16 to pass through. An upper surface of the first groove body 111 and an upper surface of the inner plate 114 are located in a same plane, the inner wall of the closed bent through-hole 113 is provided with an outer rail of the closed bent slideway 12, and the outer wall of the inner plate 114 is provided with an inner rail of the closed bent slideway 12, a guide pulley 14 of the dispensing assembly 13 is configured to move along guide directions of the inner rail and the outer rail, prevent an oscillation of the dispensing assemblies 13 during movement, and ensure stability during dispensation.

In another embodiment, the housing 11 includes the first groove body 111, a second groove body 112, the closed bent through-hole 113, the inner plate 114 and the support member 115. The second groove body is detachably connected to the first groove body 111, the upper surface of the first groove body 111 defines the closed bent through-hole 113, the inner plate 114 is disposed in the closed bent through-hole 113 and the inner wall of the closed bent through-hole 113 is opposite to the outer wall of the inner plate 114. An end of the support member 115 is fixedly connected to the inner plate 114, and another end of the support member 115 is fixedly connected to the second groove body 112. The first groove body 111 is opposite to the second groove body 12, the first groove body 111 and the second groove body 112 are formed by using a steel plate bending forming or a stamping forming, and the steel plate bending forming or the stamping forming has a low cost and is easy to make. The first groove body 111 is fixedly connected to the second groove body 112 by the support member 115 disposed between the first groove body 111 and the second groove body 112, and the support member 115 is fixedly connected to the first groove body 111 and the second groove body 112 by bolts. The inner plate 114 is installed on an upper surface of the support member 115, and the inner plate 114 is disposed inside the closed bent through-hole 113 of the first groove body 111, a space for holding the driving assembly 15 is defined between the first groove body 111 and the second groove body 112, a structure of the dispensing device is compact and the structure is convenient for maintenance. Checking holes 116 are defined on the first groove body 111 for maintenance, and the checking holes 116 further have the function for heat dissipation. That is, the first groove body 111 defines multiple holes for maintenance and heat dissipation.

In an embodiment of the disclosure, the driving member 152 includes a driving motor and a speed change gearbox, and the speed change gearbox is connected to the rotary pulling piece 151. The driving motor is connected to the rotary pulling piece 151 by the speed change gearbox. Specifically, the speed change gearbox is a deceleration device, and the speed change gearbox is configured to change a speed from a high speed rotation to a low speed rotation, and the low speed rotation is a low rotational speed of the rotary pulling piece 151, thus a need for dispensing is met.

In an embodiment of the disclosure, each of the dispensing assemblies 13 is in contact with the closed bent slideway 12 by the guide pulley 14. The guide pulley 14 includes a pulley adapted to the closed bent slideway 12, the guide pulley 14 is configured to guide along the closed bent slideway 12, so as to prevent the oscillation of the dispensing assemblies 13 during movement, and ensure the stability during dispensation.

In an embodiment of the disclosure, each of the dispensing assemblies 13 includes the guide pulley 14 and a rotary drum 132, and the rotary drum 132 is disposed on the guide pulley 14, and a side of the rotary drum 132 is provided with an opening 133. Outer circumferential surfaces of adjacent guide pulleys 14 are abutted against each other, and the commodity is placed in the rotary drum 132. In an embodiment, the number of the pulley in the guide pulley 14 is two, the two pulleys are symmetrically disposed along a diameter of the rotary drum 132, and a distance between outermost diameters of the two pulleys is smaller than a width of the closed bent slideway 12, that is a distance between outermost sides of the two pulleys is smaller than the width of the closed bent slideway.

In an embodiment of the disclosure, a side of the opening of the rotary drum 132 is provided with a segment gate. The segment gate is configured to be moved up and down along the opening 133, and the segment gate is configured to rebound after leaving with the commodity in hand. And the segment gate on the side of the opening is configured to prevent the commodity from falling.

In an embodiment of the disclosure, an upper end and a bottom end of the opening 133 are provided with guide grooves, the segment gate is matched with the opening 133, the segment gate is configured to open and close the opening 133 along the guide grooves, and the segment gate is configured to automatically reset by at least one way of a tension spring reset, a pressure spring reset and a gravity hammer lifting reset.

In an embodiment of the disclosure, a side of the segment gate is hinged to a side of the opening 133.

In an embodiment of the disclosure, the rotary pulling piece 151 includes a rotary shaft 151a and pulling pieces 151b. The rotary shaft 151a is disposed on a center of the rotary pulling piece 151. The pulling pieces 151b are symmetrically disposed along the rotary shaft 151a, a side of each of the pulling pieces 151b is provided with a pulling part 151*c*, and another side of each of the pulling pieces facing away from the pulling part 151*c* is provided with an arc-shaped part. When the rotary pulling piece 151 rotates, the protrusion 16 is driven to move by the pulling part 151*c* of the pulling pieces 151*b*.

In an embodiment of the disclosure, the cyclic rotary dispensing device further includes a reinforcement block 17 disposed on the inner plate 14. Because the driving motor occupies a supporting space of the inner plate 114, a bottom of the inner plate 114 is unsupported, sinking and deformation are easy to occur, and a normal sliding for the guide pulley 14 is affected, therefore the reinforcement block 17 is configured to strengthen the strength of the inner plate 114.

The disclosure further provides a vending device, and the vending device includes a dispensing device 10, a container 20 and a center processing unit. The container 20 is provided with at least one pickup hole, a commodity on the container is taken out through the pickup hole (i.e., target pickup hole) when one of the dispensing assemblies is moved to the pickup hole. A second detection assembly is disposed on the at least one pickup hole or the dispensing assemblies 13, and the second detection assembly is a sensor, the first detection assembly (as mentioned above) is configured to determine the dispensing position of the dispensing assemblies 13, that is, when the dispensing assemblies 13 on the closed bent slideway 12 are driven by the driving motor to move to a position that can be detected by the first detection assembly, the first detection assembly send out a command to stop the driving motor and wait for pickup. Before purchasing the commodity, when one of the dispensing assemblies 13 is moved to the pickup hole, the second detection assembly is configured to determine whether the commodity in the dispensing assembly 13 exists, in a situation that the commodity exists, the driving motor is not driven, in a situation that the commodity does not exist, the driving motor is driven to the next dispensing assembly 13.

The center processing unit is electrically connected to the dispensing device 10, and both the center processing unit and the dispensing device 10 are disposed inside the container 20, and the opening 133 of the dispensing device 10 is in communication with outside.

Referring to FIGS. 5-8, the vending device includes at least one of the dispensing devices a shape of the dispensing device 10 can be designed according to an actual need, not limited to a circle. A size and a shape of the closed bent slideway 12 can be flexibly selected according to the actual need, the number of the dispensing assemblies 13 can be flexibly selected according to the size of the closed bent slideway 12 and a size of the commodity. The vending device of the disclosure has advantages such as a compact structure, a large capacity, a high space utilization, and the number for dispensing is not limited.

The disclosure provides the cyclic rotary dispensing device and the vending device with the same, the vending device is provided with a cyclic rotary dispensing device in a unit structure, the dispensing device includes the housing 11, the closed bent slideway 12, the multiple dispensing assemblies 13, the driving assembly 15 and the first detection assembly. The container 20 is provided with the at least one pickup hole, the commodity on the container is taken out through the pickup hole when the dispensing assembly is moved to the pickup hole. The dispensing assemblies 13 are tightly arranged along the closed bent slideway 12 in sequence, the driving assembly 15 is configured to control one of the dispensing assemblies to slide forward along the closed bent slideway 12 according a command of the first detection assembly, other dispensing assemblies 13 in the closed bent slideway 12 are squeezed to slide forward in sequence. Specifically, disadvantages of existing methods in the related art are overcome, and the embodiments of the disclosure do not use a belt to connect the dispensing assemblies 13 in series. Meanwhile, it overcomes the problem that the dispensing device can only be a circular structure, the structure of the dispensing device can be also a winding and circuitous structure, which greatly expands a scope of use of the freight lanes. Moreover, efficiency for selling is improved by multiple cyclic moving dispensing assemblies of the disclosure, and the dispensing device has advantages such as a compact structure, a high space utilization rate, a low manufacturing cost, and convenient maintenance. The dispensing device can sell commodities with different packaging specifications and multiple types at the same time.

The above content is a detail description for the disclosure in conjunction with the embodiments, cannot be determined that the embodiments of the disclosure is limited to the description. Multiple simple deductions or substitutions can be made without departing from the concept of the disclosure for those skilled in the art.

What is claimed is:

1. A cyclic rotary dispensing device, applied to a vending device, an automated dispensing shelf or a display cabinet in an unmanned store, wherein the dispensing device comprises:

a housing;

a closed bent slideway, disposed on the housing;

a plurality of dispensing assemblies, disposed along the closed bent slideway and abutted against each other, wherein a bottom of each of the plurality of dispensing assemblies is provided with a protrusion;

a driving assembly, disposed below the closed bent slideway; wherein the driving assembly comprises a rotary pulling piece disposed below the closed bent slideway, and a driving member configured to drive the rotary pulling piece to rotate; and the rotary pulling piece is configured to rotate to drive the protrusion to move, to thereby make the plurality of dispensing assemblies cyclically move along the closed bent slideway; and a first detection assembly, disposed below the closed bent slideway, wherein the first detection assembly is electrically connected to the driving assembly, and the first detection assembly is configured to detect a position of each of the plurality of dispensing assemblies.

2. The cyclic rotary dispensing device as claimed in claim 1, wherein the driving member comprises a driving motor and a speed change gearbox, and the speed change gearbox is connected to the rotary pulling piece.

3. The cyclic rotary dispensing device as claimed in claim 1, wherein each of the plurality of dispensing assemblies is in contact with the closed bent slideway by a guide pulley.

4. The cyclic rotary dispensing device as claimed in claim 3, wherein each of the plurality of dispensing assemblies comprises the guide pulley and a rotary drum disposed on the guide pulley, and a side of the rotary drum is provided with an opening.

5. The cyclic rotary dispensing device as claimed in claim 4, wherein the guide pulley comprises two pulleys symmetrically disposed along a diameter of the rotary drum, and a distance between outermost sides of the two pulleys is smaller than a width of the closed bent slideway.

6. The cyclic rotary dispensing device as claimed in claim 4, wherein a side of the opening of the rotary drum is further provided with a segment gate.

7. The cyclic rotary dispensing device as claimed in claim 6, wherein two ends of the opening are provided with guide grooves, and the segment gate is configured to open and close the opening along the guide grooves.

8. The cyclic rotary dispensing device as claimed in claim 6, wherein a side of the segment gate is hinged to a side of the opening.

9. The cyclic rotary dispensing device as claimed in claim 1, wherein the housing comprises:

a first groove body, wherein an upper surface of the first groove body defines a closed bent through-hole;

an inner plate, disposed in the closed bent through-hole, wherein an inner wall of the closed bent through-hole is opposite to an outer wall of the inner plate; and a support member, disposed on a lower surface of the first groove body, wherein the support member is fixedly connected to the inner plate and the first groove body.

10. The cyclic rotary dispensing device as claimed in claim 9, wherein an upper surface of the first groove body and an upper surface of the inner plate are located in a same plane, the inner wall of the closed bent through-hole is provided with an outer rail of the closed bent slideway, and the outer wall of the inner plate is provided with an inner rail of the closed bent slideway.

11. The cyclic rotary dispensing device as claimed in claim 9, wherein the housing further comprises a second groove body, and the second groove body is detachably connected to the first groove body, an end of the support member is fixedly connected to the inner plate, and another end of the support member is fixedly connected to the second groove body.

12. The cyclic rotary dispensing device as claimed in claim 11, wherein a space for holding the driving assembly is defined between the first groove body and the second groove body.

13. The cyclic rotary dispensing device as claimed in claim 11, wherein a side of the first groove body defines holes configured for maintenance and heat dissipation.

14. The cyclic rotary dispensing device as claimed in claim 1, wherein the rotary pulling piece comprises:

a rotary shaft, disposed on a center of the rotary pulling piece;

pulling pieces, symmetrically disposed along the rotary shaft; wherein a side of each of the pulling pieces is provided with a pulling part, and a side of each of the pulling pieces facing away from the pulling part is provided with an arc-shaped part.

15. The cyclic rotary dispensing device as claimed in claim 9, wherein the inner plate is provided with a reinforcement block thereon, and the reinforcement block is configured to strengthen a strength of the inner plate.

16. A vending device, comprising at least one of the cyclic rotary dispensing device as claimed in claim 1, a container and a central processing unit;

wherein the container is provided with at least one pickup hole, a commodity on the container is taken out through a target pickup hole of the at least one pickup hole when one of the plurality of dispensing assemblies is moved to the target pickup hole;

wherein the central processing unit is electrically connected to the dispensing device, both the central processing unit and the dispensing device are disposed inside the container, and an opening of the dispensing device at a dispensing position is in communication with outside.

17. The vending device as claimed in claim 16, wherein the vending device further comprises a second detection assembly; the second detection assembly is disposed on the at least one pickup hole or the plurality of dispensing assemblies, and the second detection assembly is configured to determine whether the commodity in the one of the plurality of dispensing assemblies exists when the one of the plurality of dispensing assemblies is moved to the target pickup hole.

* * * * *